United States Patent [19]

Horiuchi et al.

[11] Patent Number: 5,390,841
[45] Date of Patent: Feb. 21, 1995

[54] METHOD OF DRAWING LARGE-SIZE ELONGATE CABLE FOR INSTALLATION

[75] Inventors: Tadanori Horiuchi, Kanagawa; Yoshiyuki Hanano, Ibaraki, both of Japan

[73] Assignee: Nippon Sheet Glass Co., Ltd., Japan

[21] Appl. No.: 944,058

[22] Filed: Sep. 11, 1992

[30] Foreign Application Priority Data

Sep. 13, 1991 [JP] Japan .................. 3-261309
Jan. 6, 1992 [JP] Japan .................. 4-000165

[51] Int. Cl.⁶ ............................. B65H 20/00
[52] U.S. Cl. ........................ 226/4; 226/108; 226/112; 226/118
[58] Field of Search ............ 226/1, 4, 108, 112, 226/113, 118

[56] References Cited

U.S. PATENT DOCUMENTS

| | | | |
|---|---|---|---|
| 3,258,261 | 6/1966 | Vath et al. | 226/112 X |
| 3,837,592 | 9/1974 | Thiery et al. | 242/83 |
| 3,944,120 | 3/1976 | Bell et al. | 226/4 |
| 4,305,537 | 12/1981 | Samokovliiski et al. | 226/108 |
| 4,474,321 | 10/1984 | Komoto et al. | 226/113 |
| 4,561,581 | 12/1985 | Kelly | 226/113 |
| 4,648,540 | 3/1987 | Steidel | 226/111 |
| 4,898,094 | 2/1990 | Doumoto et al. | 226/111 X |
| 5,086,964 | 2/1992 | Blaser | 226/108 |
| 5,219,109 | 6/1993 | Shirono | 226/4 X |

FOREIGN PATENT DOCUMENTS

| | | |
|---|---|---|
| 47-35890 | 2/1972 | Japan . |
| 51-141393 | 12/1976 | Japan . |
| 52-5490 | 1/1977 | Japan . |
| 59-76108 | 1/1984 | Japan . |
| 59-53005 | 3/1984 | Japan . |
| 61-205209 | 12/1986 | Japan . |
| 62-17442 | 4/1987 | Japan . |
| 62-202011 | 12/1987 | Japan . |
| 2192168 | 6/1988 | United Kingdom . |

Primary Examiner—Daniel P. Stodola
Assistant Examiner—John P. Darling
Attorney, Agent, or Firm—Merchant, Gould, Smith, Edell, Welter & Schmidt

[57] ABSTRACT

A large-size elongate cable is continuously drawn from a container with a plurality of spaced cable drawing machines associated with respective slave controllers controlled by a master controller. A control signal is supplied from the master controller to the slave controllers to actuate the cable drawing machines at substantially the same variable speed for thereby drawing the electric cable from the container along a predetermined cable laying route. The speed at which the cable drawing machines are actuated may selectively be varied. A slack may be formed in the electric cable between two of the cable drawing machines which are closer to the container than the other cable drawing machines.

20 Claims, 6 Drawing Sheets

METHOD OF DRAWING LARGE-SIZE ELONGATE CABLE FOR INSTALLATION

BACKGROUND OF THE INVENTION

1. Field of the Invention

The present invention relates to a method of continuously drawing a large-size elongate cable for installation.

2. Description of the Relevant Art

Figure 1:
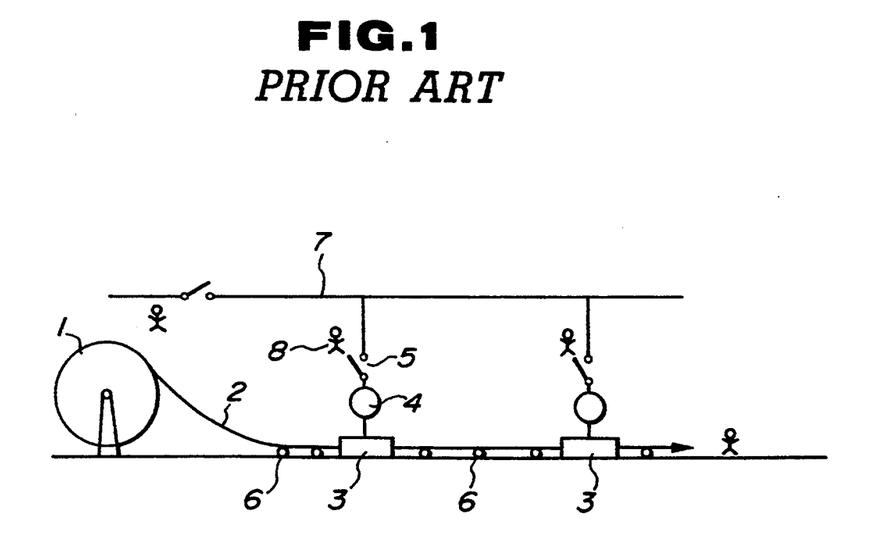
FIG. 1 is a schematic side elevational view showing a conventional process of continuously laying an electric cable for installation.

One conventional process of continuously laying an electric cable for installation is shown in FIG. 1 of the accompanying drawings.

As shown in FIG. 1, an electric cable 2 unreeled from a cable drum 1 of metal is drawn by a plurality of cable drawing machines 3 spaced at a certain interval over a plurality of cable rollers 6 disposed between the cable drawing machines 3. The cable drawing machines 3, which have caterpillars for advancing the electric cable 2, are actuated by respective induction motors 4 to feed the electric cable 2 over the cable rollers 6. The induction motors 4 are electrically connected to a power supply cable 7 through respective switches 5.

While the electric cable 2 is being withdrawn from the cable drum 1 by the cable drawing machines 3, the speed at which the electric cable 2 travels tends to vary depending on the load on the electric cable 2. Therefore, it has been customary for the cable drawing machines 3 to be attended by respective skilled operators 8 who turn on and off the switches 5 to adjust the cable speed at the respective cable drawing machines 3 while at the same time communicating with an operator who attends the cable drum 1.

Since the cable drawing machines 3 are actuated by the induction motors 4, they start to operate at full speed once the switches 5 are turned on. Consequently, it has been impossible to gradually increase or reduce the speed of operation of the cable drawing machines 3 to feed the electric cable 2. Fine adjustment of the speed of travel of the electric cable 2 has been effected manually by the skilled operators 8 who selectively turn on and off the induction motors 4 for movement of the electric cable 2 in small increments.

In the case where the electric cable 2 to be installed is of a relatively large size, the cable drawing machines 3 are spaced at an interval of at most 50 m to 60 m depending on the weight of the electric cable 2, the capacity of the cable drawing machines 3, and the capacity of the cable rollers 6. Because of a large voltage drop developed across the power supply cable 7, the electric cable 1 can be drawn over a distance up to about 1000 m in one cable drawing process.

In view of the above conventional drawbacks, there has been a demand for automatic centralized control of the drawing of an electric cable. It has also been desired to install an electric cable over a distance ranging from 5000 m to 10000 m continuously in one cable drawing process. The cable drawing machines should preferably be spaced at a distance of about 100 m for drawing the electric cable with higher efficiency, and the cable rollers should preferably have a minimum coefficient of friction.

When an electric cable is to be laid across a river or through a tunnel, it may sometimes be required to have a length in the range of from 3000 m to 5000 m. Since such a lengthy electric cable cannot be wound on a cable drum for shipment or transportation, it is wound horizontally and stored in a large-size container. To draw the electric cable from the container, the container is placed on a horizontal turntable, and the turntable is rotated in coordination with cable drawing machines spaced along a cable laying route.

The container is considerably large in size to house the lengthy electric cable, and the turntable has a considerably large weight. The total weight of the container, the electric cable, and the turntable may sometimes reach 100 tons or more. Therefore, the turntable needs to start and stop slowly when it is necessary to start and stop drawing the electric cable from the container. When a stop signal is applied in case of emergency, since the inertial forces of the turntable and the container are very large, the turntable has to be stopped after it has been braked for a certain period of time, i.e., until a certain cable length is reeled out, in order to avoid damage to various parts of the container, the turntable, and the cable drawing machines. This means that the electric cable must be loosened to form a slack therein which is commensurate with the difference between the inertia of the system of the container, electric cable, and turntable, and the inertia of the system of cable drawing machines. Consequently, it is necessary to continuously draw the electric cable while absorbing the slack without imparting undue twists and stresses to the electric cable. Heretofore, however, such a requirement has not been met by the conventional cable drawing method which has only laid the electric cable for a distance up to 1000 m.

SUMMARY OF THE INVENTION

It is an object of the present invention to provide a method of continuously drawing a large-size elongate cable with a plurality of cable drawing machines that operate at the same speed.

Another object of the present invention is to provide a method of continuously drawing a large-size elongate cable from a container while introducing a slack in the electric cable without applying undue forces thereto.

According to the present invention, there is provided a method of continuously drawing an elongate cable from a container with a plurality of spaced cable drawing machines associated with respective slave controllers controlled by a master controller, comprising the step of supplying a control signal from the master controller to the slave controllers to actuate the cable drawing machines at substantially the same variable speed for thereby drawing the cable from the container along a predetermined cable laying route.

The speed at which the cable drawing machines are actuated may selectively be varied. The speed may be varied by a servomotor controlled by an AC servo driver which is controlled by the master controller.

The method may further include the steps of detecting a fault in any one of the slave controllers, feeding a signal indicative of the detected fault to the master controller, and indicating the fault with respect to the slave controller in which the fault is detected, on the master controller.

A slack may be formed in the cable between two of the cable drawing machines which are closer to the container than the other cable drawing machines.

According to the present invention, there is also provided a method of continuously drawing an elongate cable from a container with two spaced cable drawing machines, comprising the steps of providing an elongate footing extending from the container along a cable laying route and supporting the cable drawing machines close to and remote from the container, the footing having a slack absorbing zone defined between the cable drawing machines, drawing a cable from the container onto the footing with the cable drawing machine close to the container, forming a slack in the cable in the slack absorbing zone, and feeding the cable from the footing along the cable laying route with the cable drawing machine remote from the container.

The cable may be guided along cable rollers in the slack absorbing zone.

The method may further include the step of determining the slack in the cable in the slack absorbing zone in view of the minimum radius of curvature of the cable, the sag which is developed in the cable due to the weight thereof, and the sag which will be developed in the cable due to the distance that the cable is drawn when the container is braked.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 2:
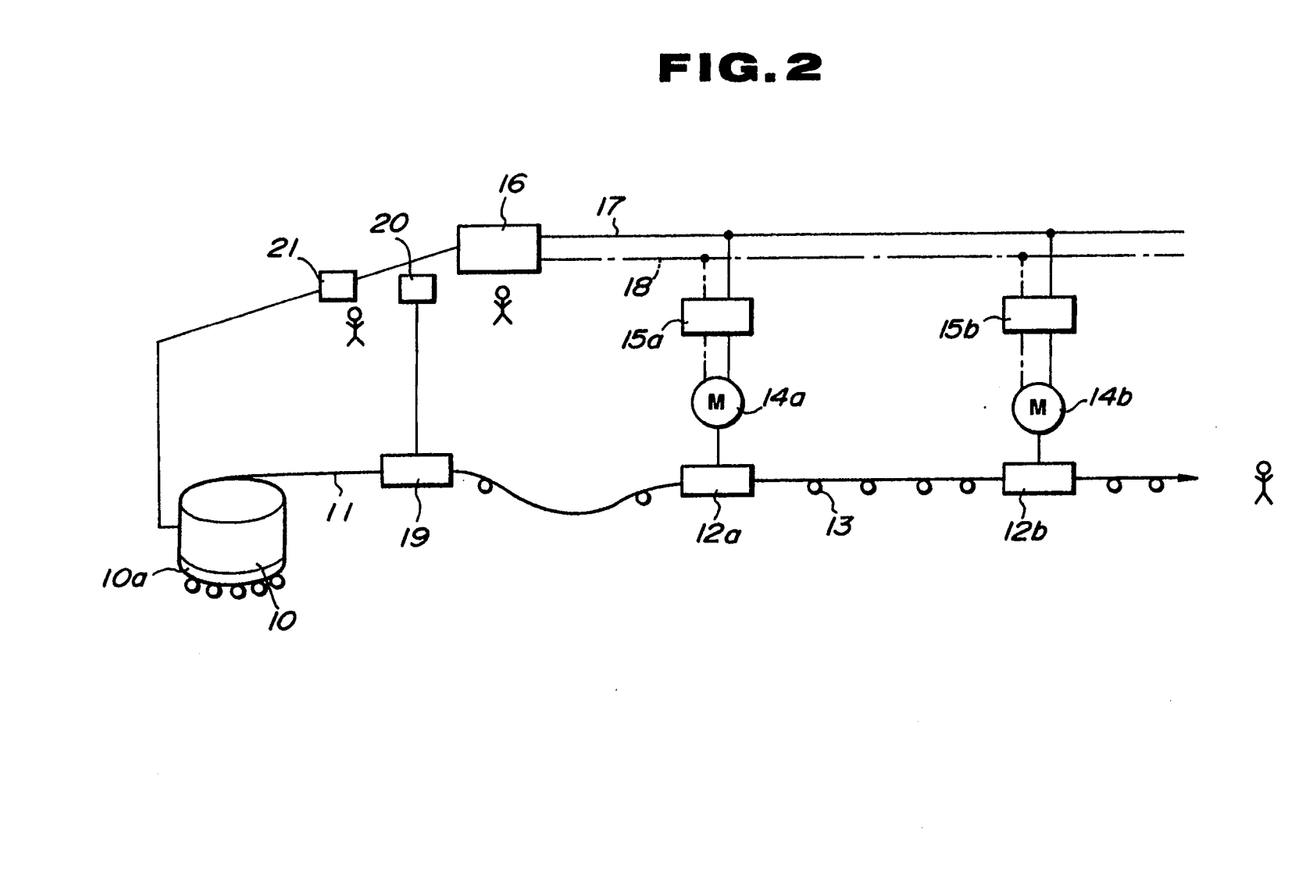
FIG. 2 is a schematic side elevational view of an apparatus for carrying out a method of continuously laying an electric cable for installation according to an embodiment of the present invention.

FIG. 2 shows an apparatus for carrying out a method of continuously laying an electric cable for installation according to an embodiment of the present invention. In FIG. 2, the apparatus continuously lays an oil-filled cable of DC 500 kV, which has an outside diameter of 130 mm and a weight of 45 kg/m, over a distance of 5000 m. The electric cable, denoted at 11, is wound in a cable container 10 placed on a horizontal turntable 10a. The apparatus includes a plurality of caterpillar-type cable drawing machines 12a, 12b spaced at intervals along a cable laying route which is 5000 m long. The cable drawing machines are spaced at substantially equal distances in a flat region of the cable laying route. The apparatus also includes a plurality of cable rollers 13 disposed between the cable drawing machines 12a, 12b for allowing the electric cable 11 to travel smoothly with reduced friction.

The cable drawing machines 12a, 12b are actuatable by respective variable-speed AC servomotors 14a, 14b which are electrically connected to respective slave controllers 15a, 15b which incorporate servo drivers and other components. The slave controllers 15a, 15b are electrically connected to a master controller 16 through a power supply cable 17 and a control cable 18 such as a telephone cable for transmitting multiplexed control signals.

Each of the cable drawing machines 12a, 12b is of an inverted U-shaped cross section for clamping a drawn electric cable therein and then lowering the electric cable into a cable laying pit in ground upon releasing the electric cable.

Figure 3:
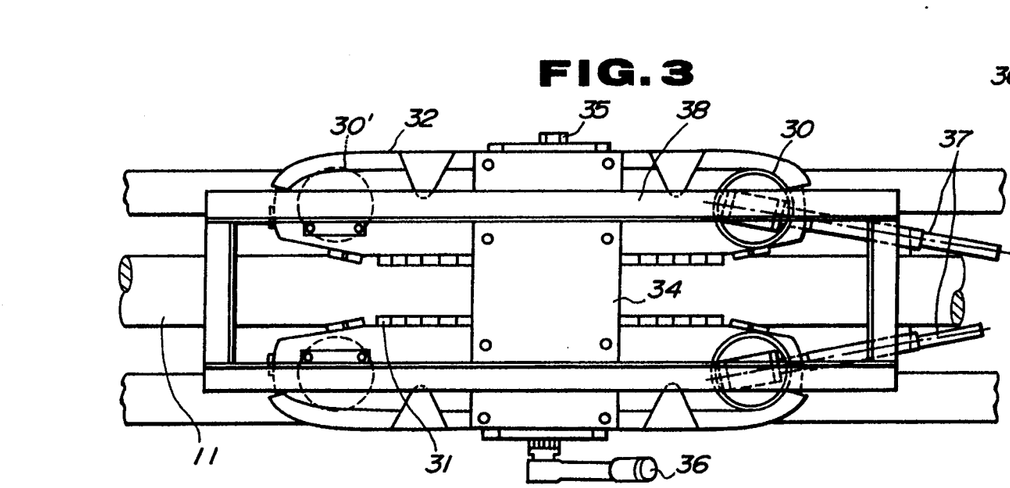
FIG. 3 is a plan view of a cable drawing machine used in the method.
Figure 4:
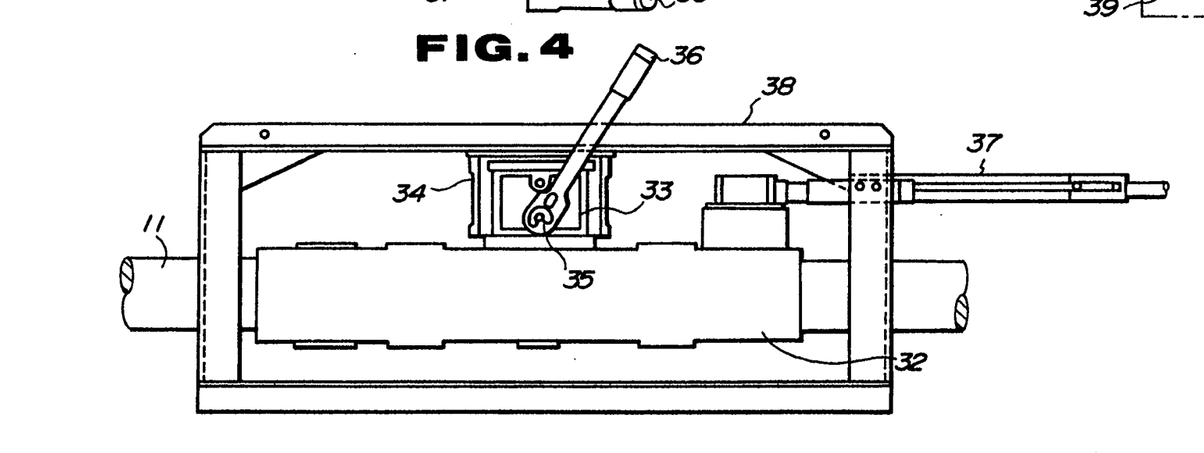
FIG. 4 is a side elevational view of the cable drawing machine.
Figure 5:
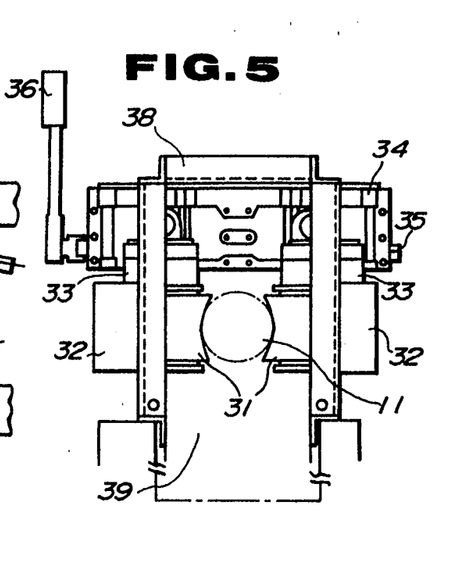
FIG. 5 is a front elevational view of the cable drawing machine.

More specifically, as shown in FIGS. 3, 4, and 5, each of the cable drawing machines 12a, 12b comprises a pair of caterpillar units each composed of a pair of spaced drive and driven gears 30, 30' and a crawler belt 31 trained around the drive and driven gears 30, 30'. Each unit also has a cover 32 and a slider 33 mounted thereon. The slider 33 is held in slidable engagement with a frame-like hanger 34 supported on a support base 38. The sliders 33 of the respective units are slidably movable in a direction transverse to the longitudinal direction of the electric cable 11, for thereby varying the transverse distance between the crawler belts 31. A bolt 35 is threaded through the sliders 33, and a torque wrench 36 is attached to one end of the bolt 35. When the torque wrench 36 is turned in one direction, the bolt 35 is turned about its own axis in the same direction, causing the sliders 33 threaded on the bolt 35 to move toward each other thereby to clamp the electric cable 11 between the crawler belts 31. When the torque wrench 36 is turned in the opposite direction, the sliders 33 are moved on the bolt 35 away from each other, releasing the electric cable 11 from between the crawler belts 31 downwardly into a cable laying pit 39 in ground. The support base 38 is mounted on a plurality of vertical legs fixedly supported on the upper edge of the opening of the cable laying pit 39.

The drive gears 30 are operatively coupled to the drive gear (not shown) of one of the servomotors 14a, 14b through respective flexible shafts 37. Therefore, when the servomotor is energized, the drive gears 30 are rotated to turn the crawler belts 31 for drawing the electric cable 11 from the cable container 10.

The cable rollers 13 are of a relatively small weight which may be achieved as by thinning flanges thereof. The cable rollers 13 have respective bearings rotatably mounted on respective shafts. The bearings provide a relatively low coefficient of friction ($\mu = 0.1$) for the rotation of the cable rollers 13.

Figure 6:
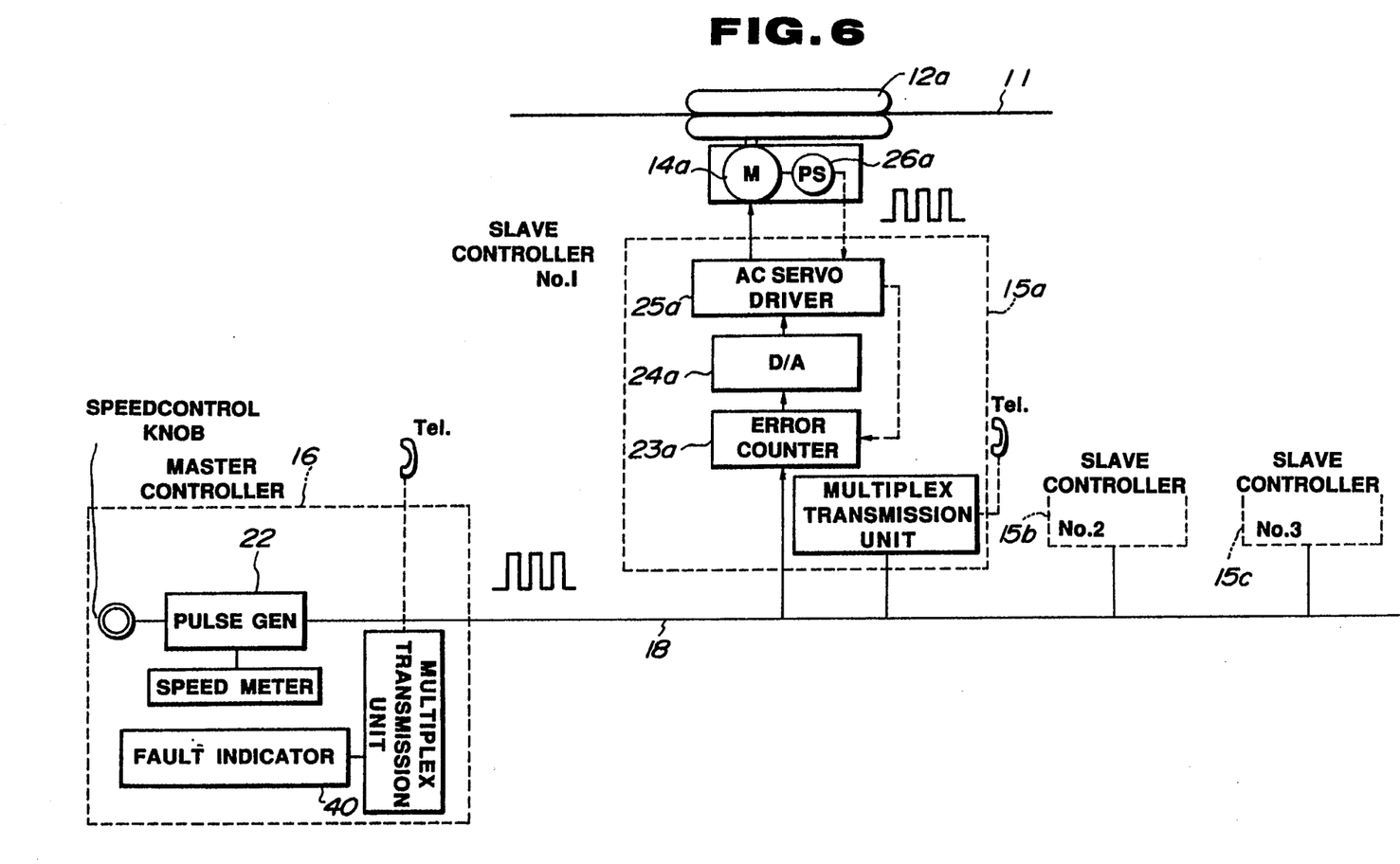
FIG. 6 is a block diagram of a control system used in the method.

FIG. 6 shows in block form a control system in the apparatus shown in FIG. 2, the control system including the master controller 16 and the slave controllers 15a, 15b, 15c. The master controller 16 has a pulse generator 22 for generating pulses which are supplied over the control cable 18 to the slave controllers 15a, 15b, 15c. Since the slave controllers 15a, 15b, 15c, . . . are identical in structure, only the slave controller 15a will be described below. The slave controller 15a has an error counter 23a for counting pulses which are then converted into a DC analog voltage by a D/A converter 24a, and the DC analog voltage from the D/A converter 24a is applied as a speed command signal to an AC servo driver 25a. In response to the speed command signal, the AC servo driver 25a energizes the servomotor 14a to actuate the cable drawing machine 12a. The slave controllers 15b, 15c are of the same structure as described above.

When the servomotor 14a is energized, an encoder 26a coupled to the shaft of the servomotor 14a generates pulses at a rate proportional to the rotational speed of the shaft of the servomotor 14a. The encoder 26a feeds the generated pulses back to the servo driver 25a, which converts the pulses into a DC voltage that is applied as a speed feedback signal to the error counter 23a. The error counter 23a compares the speed feedback signal with a speed command voltage for the control of the speed of rotation of the servomotor 14a. When command pulses are successively supplied to the slave controller 15a, the servomotor 14a is continuously energized to rotate its shaft at a controlled speed. The other cable drawing machines 12b operate in the same manner as described above. Accordingly, all the cable drawing machines 12a, 12b can operate at the same speed with the command pulses from the master controller 16. The speed of operation of the cable drawing machines can be adjusted in the range of from 0 to 10 m/min. by varying the rate of command pulses generated by the pulse generator 22 with a speed control knob which is coupled to a variable resistor in the pulse generator 22.

As shown in FIG. 2, a hydraulic caterpillar-type cable drawing machine 19 is disposed near the container 10 for drawing the electric cable 11 from the container 10. The cable drawing machine 19 has a control mechanism which puts the cable drawing machine 19 into operation only when the tension of the electric cable 11 is lower than a predetermined value. The cable drawing machine 19 has a control panel 20 disposed in the vicinity of the master controller 16, so that the cable drawing machines 12a, 12b, 19 can simultaneously be operated through the master controller 16 and the control panel 20. The container 10 and the turntable 10a can be operated through a control panel 21 which is electrically coupled to the master controller 16. In case of emergency, either the master controller 16 or the control panel 21 can produce a stop signal to inactivate the container 10 and the turntable 10a.

Figure 7:
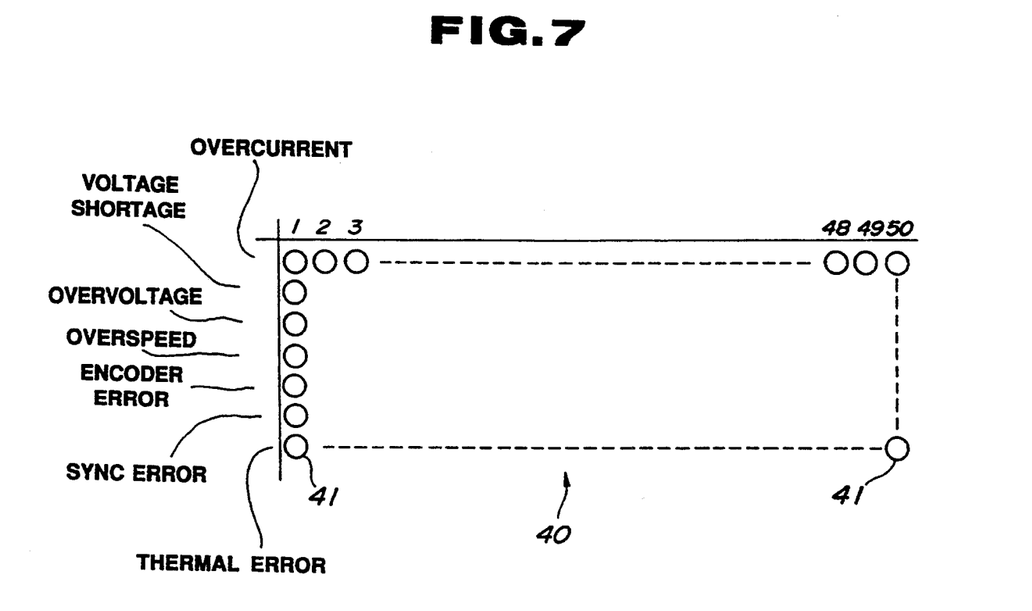
FIG. 7 is a schematic front elevational view of a fault indicator used in the method.

Faults that occur during a cable drawing process are detected by sensors in the respective slave controllers 15a, 15b, 15c, and fault data is transmitted in a multiplexed fashion through the control cable 18 to the master controller 16. The master controller 16 includes a fault indicator 40 comprising a matrix of red lamps 41, as shown in FIG. 7. These red lamps 41 are arranged in columns each corresponding to one of the slave controllers 15a, 15b, 15c which are indicated by respective numbers in the upper row in FIG. 7. When energized, the red lamps 41 in each column indicate respective faults, i.e., an overcurrent, a voltage shortage, an overvoltage, an overspeed, an encoder error, a synchronizing error, and a thermal error in one slave controller. Therefore, in the event of any fault which is indicated by one or more of the red lamps 41, the operator can immediately recognize the fault and take immediate action to remove the fault.

A process of drawing the electric cable 11 from the container 10 for installation with the apparatus described above will be described below.

The turntable 10a is turned to rotate the container 10, and the electric cable 11 is drawn from the container 10 by the hydraulic cable drawing machine 19. A slack is formed in the electric cable 11 at all times between the hydraulic cable drawing machine 19 and the first cable drawing machine 12a. Then, the master controller 16 issues a command to energize the servomotors 14a, 14b to start actuating the cable drawing machines 12a, 12b, and then to gradually increase the speed of operation of the cable drawing machines 12a, 12b for thereby drawing the electric cable 11 at an increasing speed. During this time, the hydraulic cable drawing machine 19 operates in coordination with the cable drawing machines 12a, 12b to keep a predetermined slack continuously formed in the electric cable 11. The slack in the electric cable 11 should be large enough to absorb a cable length which is drawn when the cable drawing machines 12a, 12b and the container 10 are stopped at different times due to different inertial forces as in case of emergency.

In the above embodiment, since the cable drawing machines 12a, 12b are controlled to draw the electric cable 11 at the same speed, the electric cable 11 can be drawn over a long cable laying route under the centralized control of the master controller 16 even if the cable laying route contains curved or bent sections, or inclined or vertical sections, or both.

According to the cable drawing method of the above embodiment, all the cable drawing machines 12a, 12b can be synchronized by the master controller 16 to draw the electric cable 11 at the same speed, so that they can draw long electric cables having lengths ranging from 5 km to 10 km, while being virtually unattended by operators. Due to the improved capacity of the cable drawing machines 12a, 12b and the reduced friction of the cable rollers 13, the cable drawing machines 12a, 12b used to draw an electric cable which is 5000 m long can be spaced at increased intervals of 100 m, which almost doubles the conventional intervals. As a result, the required number of cable drawing machines 12a, 12b is about half the number of cable drawing machines employed in the conventional cable drawing method, and hence the cost of laying an electric cable is reduced to about half the conventional cost of laying an electric cable. Heretofore, a minimum number of operators required to lay an electric cable over 1000 m was 25, including two for handing the drum, one for operating on the main switch, twenty (spaced at an interval of 50 m) for actuating the cable drawing machines, and two for guiding the leading end of the electric cable. According to the aforesaid method of the present invention, at least only five operators, including one for attending the container, one for attending the master controller, two or three for supervising the cable drawing machines and associated components, and one for guiding the leading end of the electric cable, are required to lay an electric cable which is 5000 m long. Therefore, the required manpower is about 1/5 of that which is needed to lay an electric cable according to the conventional process. Since the length of an electric cable that can be drawn according to the present invention is five times the length of an electric cable that can be drawn according to the conventional method, the method according to the present invention has a cable drawing capacity which is about 25 times the conventional cable drawing capacity.

Furthermore, because a continuous electric cable having a length of 5000 m or more can be laid without any cable junctions, the method according to the present invention allows the electric cable to be laid within a period of time which is half or less than half the period of time which has heretofore been required because cable junctions have been needed at intervals of at most 1000 m according to the conventional method.

Figure 8:
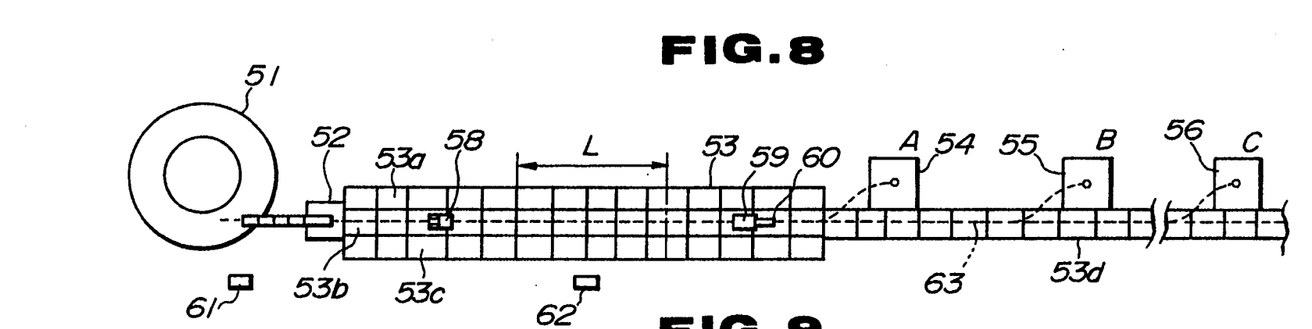
FIG. 8 is a plan view of an apparatus for carrying out a method of continuously laying an electric cable for installation according to another embodiment of the present invention.
Figure 9:
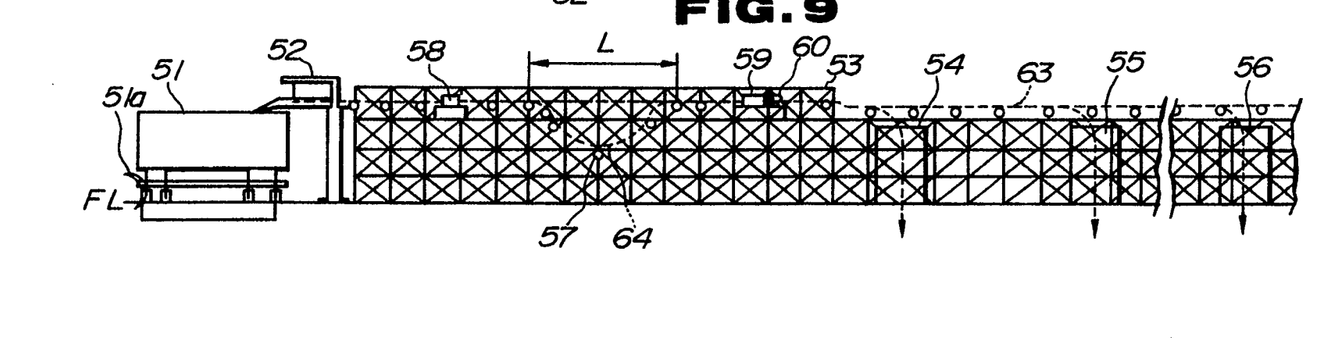
FIG. 9 is a side elevational view of the apparatus shown in FIG. 8.
Figure 10:
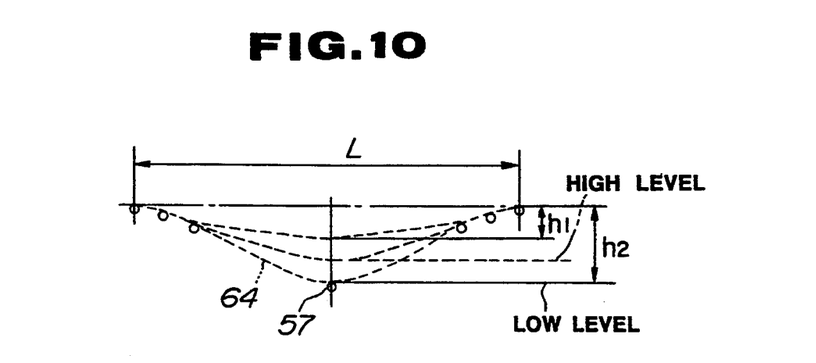
FIG. 10 is a diagram showing slacks in an electric cable which are formed in a slack absorbing zone in the apparatus shown in FIG. 8.

FIGS. 8 through 10 show an apparatus for carrying out a method of continuously laying an electric cable for installation according to another embodiment of the present invention. In this embodiment, the apparatus continuously lays an OF cable of DC 500 kV, which has an outside diameter of 130 mm and a weight of 45 kg/m, over a distance of 5100 m.

The method shown in FIGS. 8 through 10 is basically directed to the formation of a slack in the electric cable between the hydraulic cable drawing machine 19 and the first cable drawing machine 12a used in the method shown in FIG. 2.

The electric cable, denoted at 63, is wound in a container 51 having an inside diameter of 3500 mm, an outside diameter of 8000 mm, and a height of 3500 mm. The container 51 is placed on a horizontal turntable 51a. A cable shooter 52 is positioned near the container 51 for directing the electric cable 63 unwound from the container 51.

An elongate footing 53 extends from a position near the cable shooter 52 along a cable laying route, which extends along a cable laying pit in ground. The cable shooter 52 is positioned between one end of the frame 53 and the container 51. The footing 53 is substantially as high as the container 51, and includes three parallel frames 53a, 53b, 53c extending from the end near the cable shooter 52 over a distance of about 30000 mm from the center of the container 51. The central frame 53b is lower than the other side frames 53a, 53c, and the electric cable 63 passes through a cable path which is defined above the central frame 53b and between the side frames 53a, 53c. The upper edge of the central frame 53b is indicated by the thicker solid line in FIG. 9. Beyond the distance of 30000 mm from the center of the container 51, the footing 53 includes only one frame 53d which extends from the end of the central frame 53b to the end of the cable laying route. The electric cable 63 travels over the frame 53d.

Three turrets 54, 55, 56 are disposed at spaced intervals along the frame 53d. The turrets 54, 55, 56 serve to introduce the electric cable 63 from above the frame 53d downwardly into the cable laying pit. In this embodiment, the turrets 54, 55, 56 are capable of introducing respective different electric cables into the cable laying pit.

A plurality of spaced cable rollers 57 are rotatably supported in the cable path by the footing 53. Specifically, the cable rollers 57 have opposite ends supported on confronting sides of the side frames 53a, 53c. The footing 53 also supports a hydraulic cable drawing machine 58 near its end close to the cable shooter 52, and a cable drawing machine 59 near the opposite end. The hydraulic cable drawing machine 58 is positioned above the central frame 53b, and the cable drawing machine 59 is positioned above the central frame 53b. The cable path includes a slack absorbing space or zone L positioned between these cable drawing machines 58, 59 and extending horizontally and vertically. As shown in FIG. 9, the central frame 53b has its upper edge lowered between the cable drawing machines 58, 59, thus defining the slack absorbing zone L.

The hydraulic cable drawing machine 58, which may be identical to the hydraulic cable drawing machine 19 shown in FIG. 2, serves to draw the electric cable 63 from the container 51 under a predetermined tension, and the cable drawing machine 59, which may be identical to the cable drawing machine 12a shown in FIG. 2, has a variable-speed AC servomotor 60 which actuates crawler belts to feed the electric cable 63.

In FIG. 8, the container 51 and the turntable 51a can be controlled by a control panel 61 near the container 51, which is attended by an operator who operates on the control panel 61 while checking the interior of the container 51. The cable drawing machines 58, 59 can be controlled by a centralized control panel 62 near the footing 53, which is attended by an operator who operates on the control panel 62 while observing the slack in the electric cable 63 in the slack absorbing zone L. The slack in the electric cable 63 may be monitored through a television camera placed in the slack absorbing zone L, so that the control panel 62 may be positioned somewhere else.

The electric cable 63, which is 5100 m long, weighs about 230 tons, and the container 51 and the turntable 51a have a total weight of about 30 tons. Therefore, the electric cable 63, the container 51, and the turntable 51a have a total weight of about 260 tons. The container 51 starts to be rotated by the turntable 51a and then rotates at a speed (at its outer periphery) matching the speed (10 m/min. at maximum) of operation of the cable drawing machines 58, 59. When the entire apparatus is inactivated, the container 51 is slowly stopped. The speed of rotation of the container 51 can be varied by a speed control knob on the control panel 61. The speed of operation of the cable drawing machines 58, 59 can be varied by a speed control knob on the control panel 62. The turntable 51a and the cable drawing machines 58, 59 are coordinated with each other such that they can be manually or automatically stopped in case of emergency when a fault signal indicative of a fault of either the turntable 51a or the cable drawing machines 58, 59 is produced.

In operation, the electric cable 63 is unreeled from the container 51 upon rotation of the turntable 51a, and fed through the cable shooter 52. The electric cable 63 is drawn by the hydraulic cable drawing machine 58 onto the footing 53, and travels on the cable rollers 57 while forming a slack 64 in the slack absorbing zone L. Then, the electric cable 63 is fed by the cable drawing machine 59 onto cable rollers on the frame 53d, from which the electric cable 63 can be introduced into the cable laying pit through a selected one of the turrets 54, 55, 56.

The slack 64 formed in the slack absorbing zone L is selected in view of the minimum radius R of curvature of the electric cable 63 ($R \geq 25d$, d is the outside diameter of the electric cable), the sag developed in the electric cable 63 due to the weight thereof, and the sag which will be developed in the electric cable 63 due to the distance that it is drawn when the container 51 is braked to a stop. Specifically, as shown in FIG. 10, if the slack absorbing zone L is 10 m long, then the slack 14 should range between a high level $h1 = 720$ mm to which the electric cable 63 can sag due to its own weight and a low level $h2 = 2100$ mm to which the electric cable 63 can sag in view of the minimum radius R of curvature thereof. It was confirmed that the electric cable 63 sagged a vertical distance of 1620 mm when it was drawn a distance of 500 mm after the container 51 was braked, and that after the electric cable 63 had sagged to the lower level of 2100 mm, it was able to absorb the cable length of 800 mm which was drawn after the container 51 was braked.

If the slack absorbing zone L is 10 m long, then the cable rollers 57 in the slack absorbing zone L should preferably be positioned at the opposite ends of the slack absorbing zone L, the lowest point of the low level h2, and locations which are horizontally spaced 750 mm and 1500 mm from each of the opposite ends of the slack absorbing zone L along the curvature of the electric cable 63 whose radius is minimum. Such an arrangement of the cable rollers 57 for guiding the electric cable 63 in the slack absorbing zone L is effective to prevent the electric cable 63 from buckling in the slack absorbing zone L while the electric cable 63 is being drawn.

In the event of some trouble or fault, the apparatus may have to be stopped immediately while the electric cable 63 is being drawn from the container 51 by the cable drawing machines 58, 59. When the apparatus has to be stopped, the cable drawing machines 58, 59 can immediately be stopped in response to a stop signal, and substantially no cable length is drawn when the cable drawing machines 58, 59 are stopped. However, inasmuch as the electric cable 63, the container 51, and the turntable 51a have a total weight of about 260 tons, the container 51 cannot immediately be stopped in response to a stop signal because of very large inertial forces acting thereon. The container 51 can only be stopped when the electric cable 63 is drawn over a certain distance after the container 51 has been braked. An experimental result indicated that after the container 51 had been braked, the electric cable 63 was drawn over a distance ranging from 150 mm to 500 mm depending on the weight of the electric cable 63 wound in the container 51 and the braking force applied to the container 51. Such an additional cable length drawn when the apparatus is brought to a stop can be absorbed by a change in the slack 64.

When drawing the electric cable 63 from the container 51, it is necessary to start the cable drawing machines 58, 59 at different times so as not to apply an excessive tension to the electric cable 63 and undue forces to the cable drawing machines 58, 59. Such a time delay in the operation of the cable drawing machines 58, 59 can also be absorbed by a change in the slack 64.

Furthermore, when it is necessary to change the speed of operation of the cable drawing machines 58, 59 while they are drawing the electric cable 63 from the container 51, a resulting speed difference between the container 51 and the cable drawing machines 58, 59 can also be absorbed by a change in the slack 64.

A change in the slack 64 which serves to compensate for any of the above conditions, i.e., the large inertial forces, the time delay, and the speed difference, is in the form of a change in the arcuate shape of the slack 64 in the slack absorbing zone L, and should be determined in advance taking into account the minimum radius of curvature of the electric cable 63, the inertial forces of the container 51, the time delay in the operation of the cable drawing machines 58, 59, and the speed difference between the container 51 and the cable drawing machines 58, 59.

The slack 14 has a single arcuate shape in the slack absorbing zone L in the above illustrated embodiment. However, in the case where the footing 53 does not have a sufficient height, the slack 14 may have two or more arcuate sections. Furthermore, the slack 14, which is shown as being vertical, may extend horizontal.

The principles of the present invention are also applicable to the drawing of communications and control cables, flexible plastic pipes, metallic pipes, and various other elongate wires, cables, and pipes.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A method of continuously drawing an elongate cable from a rotatable container controlled by a control panel with a plurality of spaced cable drawing machines associated with respective slave controllers controlled by a master controller, comprising the steps of:

supplying a first control signal from said control panel to rotate said container so as to supply said cable at a predetermined speed; and supplying a second control signal from the master controller to the slave controllers to actuate the cable drawing machines at substantially the same predetermined speed for thereby drawing the cable from the container along a predetermined cable laying route.

2. A method according to claim 1, further including the step of:

selectively varying the speed at which the cable drawing machines are actuated.

3. A method according to claim 1, further including the step of:

causing said cable drawing machine to pull said cable from said container only when tension in said cable is less than a predetermined value.

4. A method according to claim 1, further including the steps of:

detecting a fault in any one of the slave controllers;

feeding a signal indicative of the detected fault to the master controller; and indicating the fault with respect to the slave controller in which the fault is detected, on the master controller.

5. A method according to claim 1, further including the step of:

forming a slack in the cable between two consecutive cable drawing machines.

6. A method according to claim 1, further including the step of:

selectively varying the speed at which the cable drawing machines are actuated, with a servomotor controlled by an AC servo driver which is controlled by the master controller.

7. A method according to claim 6, further including the step of:

generating a feedback speed signal at said servomotor to feed back to the slave controller for comparison with a speed command signal from said master controller.

8. A method of continuously drawing an elongate cable from a container with first, second, and third spaced cable drawing machines, said first and second cable drawing machines being located nearer said container than said third cable drawing machine, comprising the steps of:

providing an elongate footing extending from the container along a cable laying route and supporting the first and second cable drawing machines, said footing having a slack absorbing zone defined between the first and second cable drawing machines;

drawing an electric cable from the container onto said footing with the first cable drawing machine;

forming a slack in the cable in said slack absorbing zone; and feeding the cable from said footing along the cable laying route with the second and third cable drawing machine.

9. A method according to claim 8, further including the step of:

guiding the cable along cable rollers in the slack absorbing zone.

10. A method according to claim 8, further including the step of:

determining the slack needed in the cable in said slack absorbing zone in view of the minimum radius of curvature of the cable, the slack which is developed in the cable being due to the weight thereof, and the slack required in case of container braking before stopping said third cable drawing machine.

11. A system for laying elongate cable, comprising:

an arrangement of cable drawing machines which draw said cable from a container, said arrangement of cable drawing machines including a first cable drawing machine and other cable drawing machines;

means for controlling said arrangement of cable drawing machines, said controlling means including means for determining at said first cable drawing machine tension in said cable lower than a predetermined value, said controlling means further including means for running said first cable drawing machine when said tension determining means determines that the tension is less than said predetermined minimum, said controlling means also including a master controller and slave controllers, each of said slave controllers controlling one of said other cable drawing machines, said master controller controlling said slave controllers; and a horizontal turntable for said container, said controlling means including a first control panel to control said turntable and a second control panel for said running means, said second control panel and said master controller being in proximity with one another, said controlling means further including means for coupling said first control panel and said master controller so that an emergency stop signal for said turntable and said other cable drawing machines can be initiated at any one of said first control panel and said master controller.

12. A system for laying elongate cable, comprising:

an arrangement of cable drawing machines which draw said cable from a container, said arrangement of cable drawing machines including a first cable drawing machine and other cable drawing machines; and means for controlling said arrangement of cable drawing machines, said controlling means including a master controller and slave controllers, each of said slave controllers controlling one of said other cable drawing machines, each of said slave controllers including means for sensing faults and said master controller including means for displaying faults sensed, said master controller controlling said slave controllers.

13. The system in accordance with claim 12 wherein said controlling means includes variable speed alternating current servomotors for driving each of said other cable drawing machines, each of said servomotors being driven by a slave controller, wherein said master controller includes means for generating first pulses and each of said slave controllers includes means for using said first pulses to create a speed command signal which is communicated to each servomotor.

14. The system in accordance with claim 13 including a plurality of encoders, wherein each servomotor has a shaft with an encoder coupled to the shaft to generate second pulses at a rate proportional to the rotational speed of the shaft, said second pulses being fed back to said slave controller to create a speed feedback signal for comparison with said speed command signal.

15. The system in accordance with claim 12 wherein said controlling means includes means for adjusting speed of said cable drawing machines to pull said cable within a range of 0 to 10 meters per minute.

16. A system for laying elongate cable, comprising:

an arrangement of cable drawing machines which draw said cable from a container, said arrangement of cable drawing machines including a first cable drawing machine and other cable drawing machines, said arrangement including a horizontal rotatable turntable controlled with a first control signal from a control panel, said container resting on said turntable; and means for controlling said arrangement of cable drawing machines, said controlling means including a master controller and slave controllers, each of said slave controllers controlling one of said other cable drawing machines, said master controller controlling said slave controllers with a second control signal, said controlling means further including means for maintaining sufficient slack in said cable large enough to absorb due to different inertial forces a cable length when said turntable with container thereon and said other cable drawing machines are stopped at different times as in case of emergency.

17. The system in accordance with claim 16 including an elongate footing extending along a cable laying route and a cable shooter positioned between one end of said footing and said container.

18. The system in accordance with claim 17 wherein said footing includes a first portion having parallel central and opposing side frames and a second portion having single frame extending from said central frame to the end of the cable laying route, said central frame being lower than said side frames.

19. The system in accordance with claim 18 wherein said first cable drawing machine is installed at a first end of said first portion of said footing and one of said other cable drawing machines in installed at a second end of said first portion, said central frame being formed to provide a slack absorbing zone between said first cable drawing machine and said one of said other cable drawing machines.

20. The system in accordance with claim 19 including a television camera for monitoring the slack of said cable in said slack absorbing zone.

* * * * *

UNITED STATES PATENT AND TRADEMARK OFFICE
CERTIFICATE OF CORRECTION

PATENT NO. : 5,390,841
DATED : Feb. 21, 1995
INVENTOR(S) : Horiuchi et al.

It is certified that error appears in the above-indentified patent and that said Letters Patent is hereby corrected as shown below:

Column 4, line 16, insert --the-- after the word "in".

Column 4, line 40, insert --the-- after the word "in".

Column 4, line 62, delete ",..." after the numeral "15c".

Column 6, line 44, "handing" should read --handling--.

Column 7, line 8, "OF" should read --oil filled--.

Column 11, line 12, "machine" should read --machines--.

Signed and Sealed this

Seventeenth Day of October, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,390,841
DATED : February 21, 1995
INVENTOR(S) : Horiuchi, et al

It is certified that error appears in the above-indentified patent and that said Letters Patent is hereby corrected as shown below:

On the Title Page, Item [73] Assignee: replace "Nippon Sheet Glass Col, Ltd." with —Hitachi Cable Ltd.—.

Signed and Sealed this

Thirteenth Day of February, 1996

Attest:

BRUCE LEHMAN

Attesting Officer     Commissioner of Patents and Trademarks